United States Patent [19]

Woyton

[11] 3,916,326

[45] Oct. 28, 1975

[54] SENSING CIRCUIT INCLUDING POLARITY DISCRIMINATOR

[75] Inventor: Joseph T. Woyton, South Bend, Ind.

[73] Assignee: Reliance Electric Company, Mishawaka, Ind.

[22] Filed: Jan. 31, 1974

[21] Appl. No.: 438,232

[52] U.S. Cl............. 328/118; 307/236; 324/165 T; 324/166
[51] Int. Cl.² .......................................... H03K 5/20
[58] Field of Search ........... 324/165, 166, 173, 174; 328/118; 307/236

[56] References Cited
UNITED STATES PATENTS

| | | | |
|---|---|---|---|
| 3,210,570 | 10/1965 | Brock et al. | 328/118 X |
| 3,247,456 | 4/1966 | Doketer et al. | 324/174 |
| 3,697,782 | 10/1972 | Matouka | 328/118 |

FOREIGN PATENTS OR APPLICATIONS 1,280,306  10/1968  Germany .......................... 307/236

Primary Examiner—Robert Segal
Attorney, Agent, or Firm—Marmaduke Hobbs

[57] ABSTRACT

A sensing circuit using a polarity discriminator with feedback means for selecting one polarity component of a bi-polar non-symmetrical waveshape signal input, while rejecting the opposite polarity component. The circuit operates on both the amplitude and the frequency characteristics of the input signal to produce an output signal responsive to these characteristics. The circuit may be used to process signals generated from toothed wheels by electromagnetic sensors, or the like, typically used in tachometer control.

4 Claims, 8 Drawing Figures

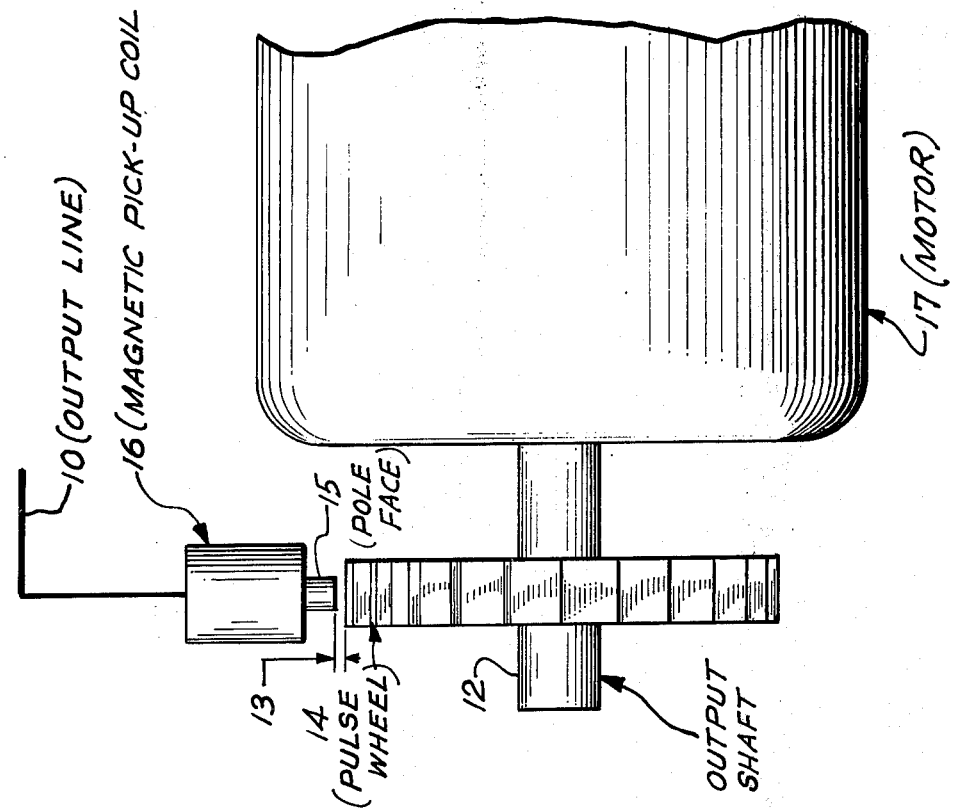
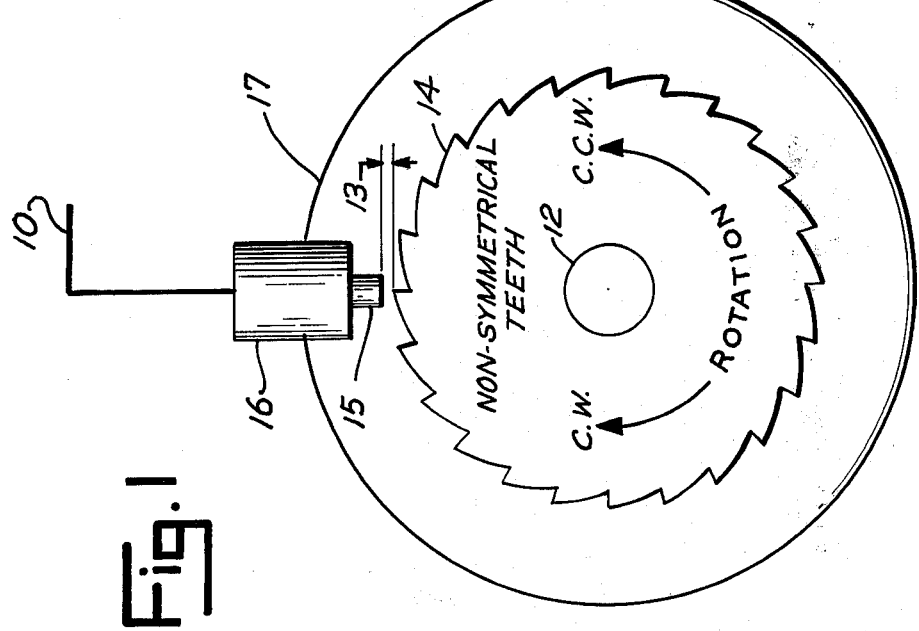

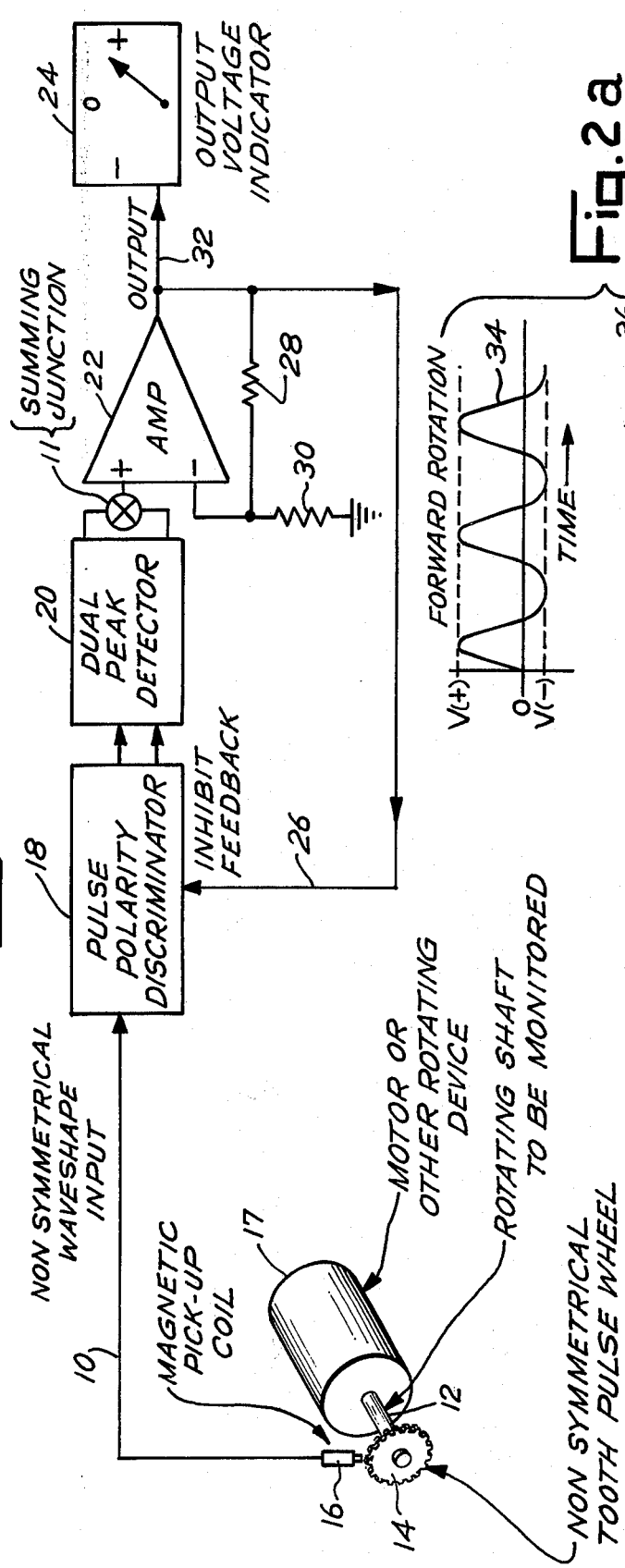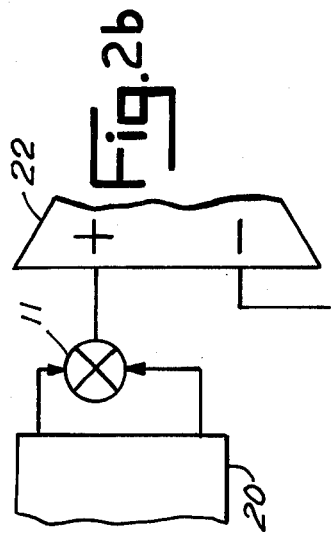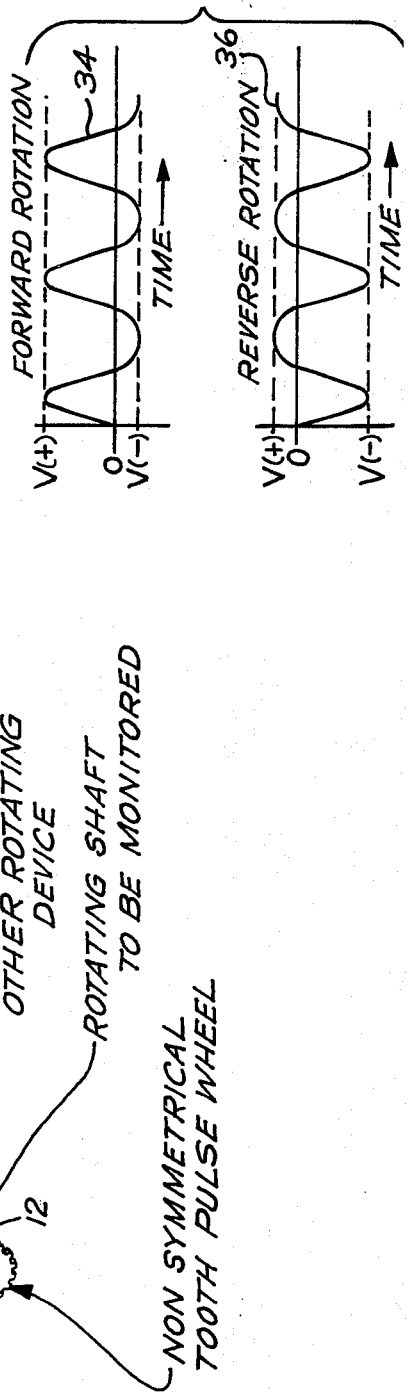

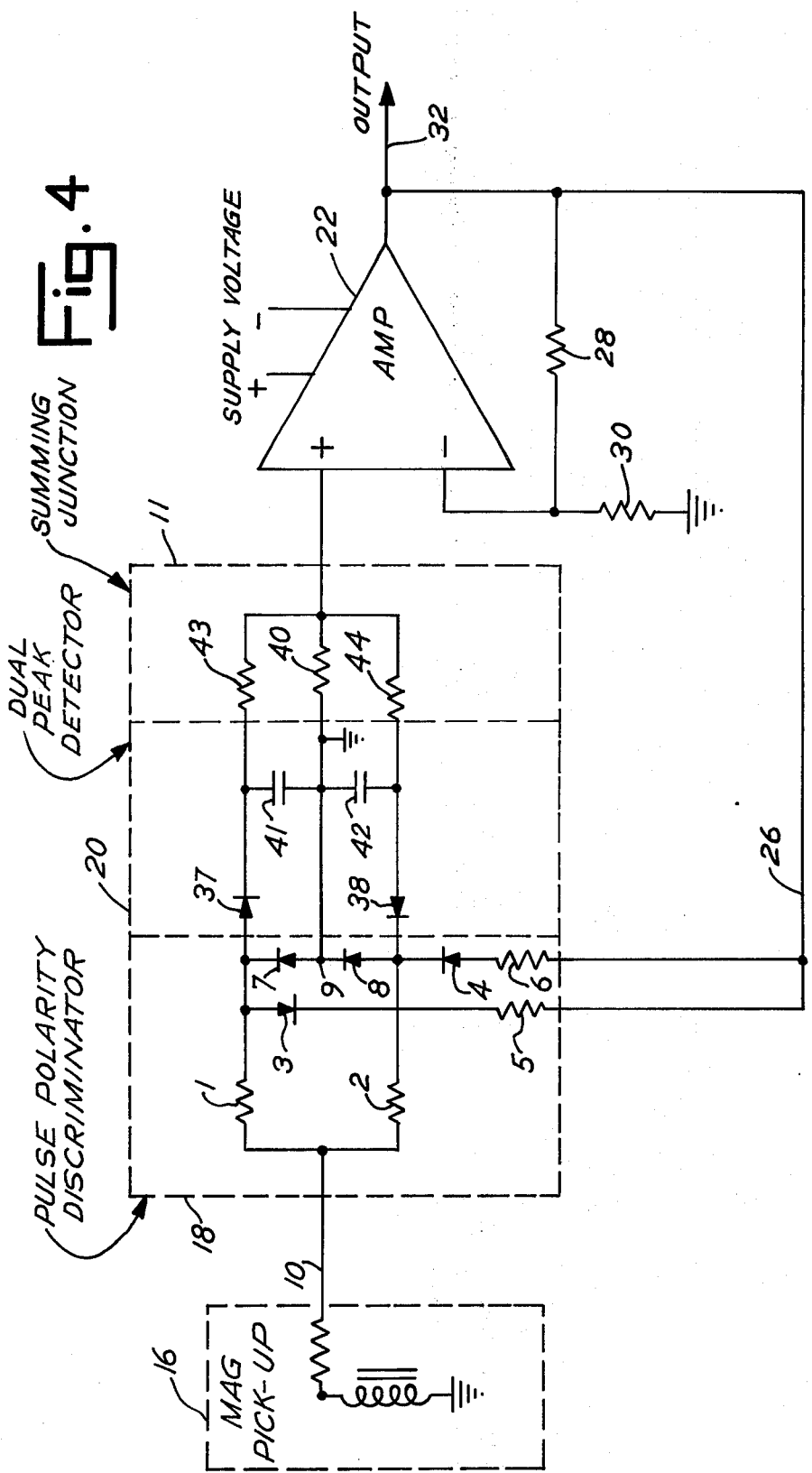

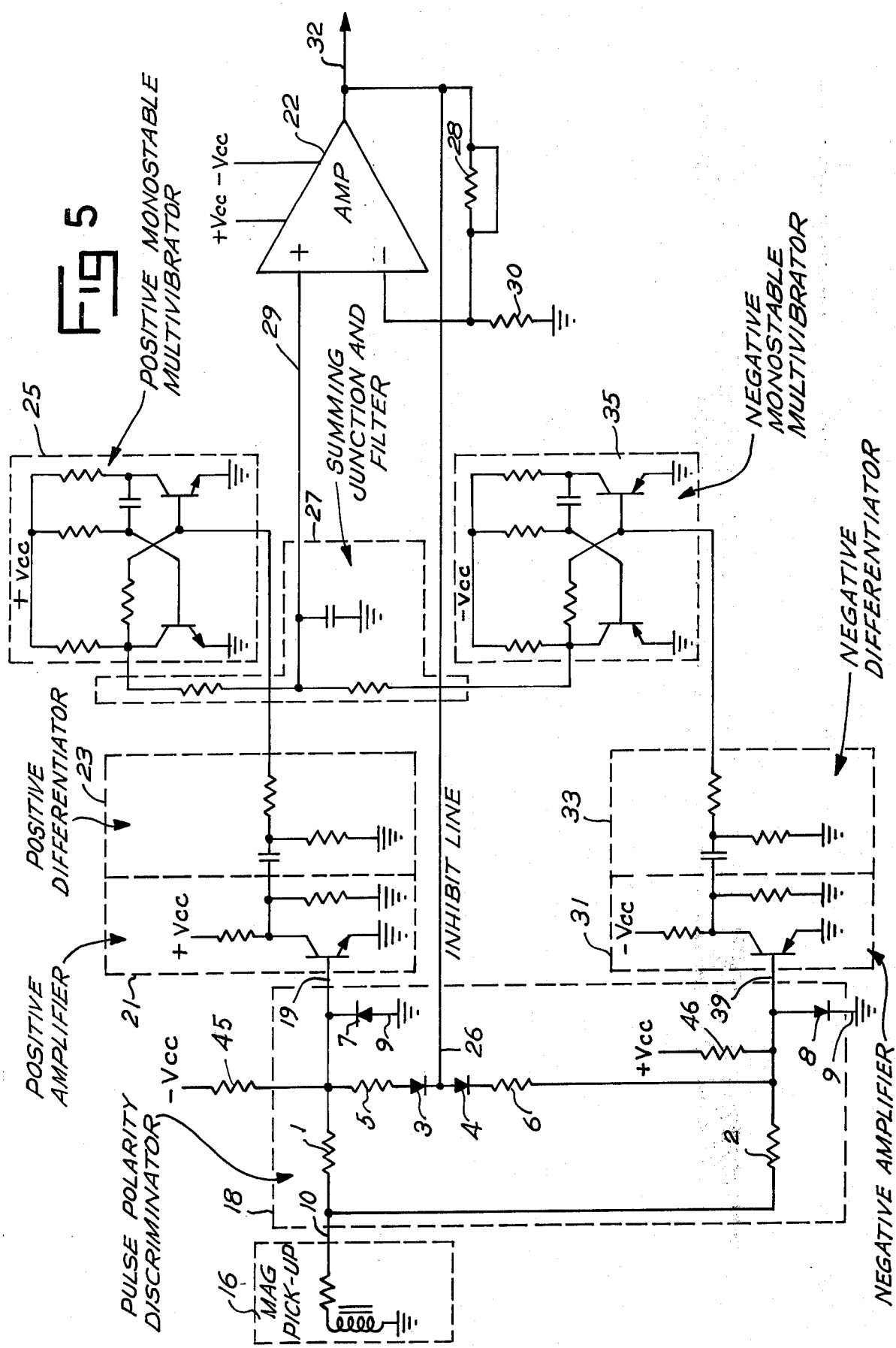

SENSING CIRCUIT INCLUDING POLARITY DISCRIMINATOR

This invention relates to sensing circuits and more particular to a method of sensing both magnitude and polarity of a waveshape generated by a suitable sensor.

The motion of objects past a sensing point can be determined by monitoring the output of a sensor placed near an object in motion. An electrical output will be generated from the sensor each time the moving object passes the sensing point. The amplitude of the electrical output signal will be proportional to the speed of the object in motion. The frequency of the electrical output will be proportional to the rate at which the first object leaves the sensing point and another similar moving object enters the sensing point. Rotating shaft speed monitors have been constructed using a symmetrical toothed metallic gear attached to the shaft, with teeth placed adjacent to a magnetic sensor. The sensor output for such a scheme will be a symmetrical alternating voltage of amplitude proportional to gear tooth speed past the sensing point, and a frequency proportional to the rate of tooth passing. If this voltage is measured, it will provide an indication of speed. If this frequency is measured, it will also provide an indication of speed. Neither measurement will provide an indication of which direction, clockwise or counterclockwise, that the shaft is rotating.

An object of this invention is to provide a simple and reliable circuit arrangement that will enable the sensing and determination of both speed and direction of rotation.

Non-symmetrical teeth have been used on speed sensing gears to provide an indication of direction of rotation of the gear teeth passing the magnetic sensor. The sensor output for such a scheme will be a voltage amplitude proportional to speed, a frequency proportional to the rate of tooth passing and a nonsymmetrical waveshape indicative of gear tooth geometry and direction of rotation. The voltage amplitude and frequency will be indicative of rotational speed. The signal waveshape will have a larger positive peak amplitude, or a larger negative peak amplitude, depending upon the direction of tooth rotation. Waveshape analysis will show the signal characteristics inverted when the direction of rotation is reversed, thereby providing direction sensing. Dual positive and negative averaging detectors are not useful as waveshape discriminators, since the average amplitudes are identical for both the positive and negative portions of the sensor electrical signal, regardless of waveshape. Dual positive and negative peak detectors with a summing junction have been used as waveshape discriminators. These are inefficient, since the algebraic sum of the positive and negative peaks is the resultant output. This sum is considerably less than the amplitude of either the positive or the negative component considered separately.

Another object of this invention is to provide an efficient method of waveshape discrimination for purposes of indicating the direction of rotation of a non-symmetrical tooth pulse wheel.

Peak detectors with fixed level logic elements are useful as waveshape discriminators to sense whether the positive or the negative portion of the waveform has greater peak amplitude, thereby providing rotational direction sensing. These devices have the disadvantage of limited dynamic range and would be subjected to considerable overload as both the desired and the undesired signal polarity components increase in amplitude as the rotational speed increases.

Another object of this invention is to provide a peak level discriminator which employs a feedback means to inhibit the undesired signal polarity, with the inhibit function increasing or decreasing as the incoming signal increases or decreases in amplitude with rotational speed, thereby continually compensating for changes in the amplitude of the undesired signal polarity.

Magnetic sensors in conjunction with rotating gears have been used as tachometers to generate a speed signal for control purposes to regulate motor speed. Systems of this type require selection of either a positive signal output or a negative signal output from the sensor, depending upon the motor rotation direction. Proper tachometer polarity is essential for proper operation of the servo loop in the speed control circuits. Sensor polarity is selected manually to coincide with the motor direction selected. A system of this type can have unstable operation when a rotation reversal is switched by the operator. Mechanical and electrical lags in the system can result in the sensor tachometer feedback signal going out of phase with the speed reference signal. The motor could then operate at full maximum speed, in an uncontrolled open-loop fashion since direction tracking and polarity correlation has been lost for the servo loop.

Another object of this invention is to provide a system for automatic tracking of speed and direction of rotation and automatic selection of proper sensor sigal polarity. In certain instances it is desirable to use an AC tachometer generator frequency as the control signal in a speed monitoring system. Critical applications may be unable to tolerate the uncertainties of amplitude calibration, long term sensitivity changes, or uncompensated thermal variations that can cause errors in analog system processing. These critical applications will rely on the frequency of an AC tachometer generator as the control signal for the speed monitoring system. Tachometer frequency will be stable, not subject to calibration drift or thermal variations encountered in analog amplitude control systems.

Another object of this invention is to provide a system for monitoring speed and direction of rotation, where signal frequency is controlling parameter.

Embodiments of the invention will now be described, by way of example, with reference to the accompanying drawings, in which:

FIGS. 1 and 1a show an arrangement of an electromagnetic pick-up coil and non-symmetrical metallic toothed gear comprising a non-symmetrical wave generating system.

FIGS. 2, 2a and 2b are a logic diagram of an arrangement in accordance with the invention, for providing an output indicative of both speed and direction, where input amplitude is a controlling parameter and diagrams showing the wave for forward and reverse rotation.

FIG. 4 is a circuit diagram of the logic elements in FIG. 2.

FIG. 5 is a circuit diagram of the logic elements in FIG. 3.

Figure 3:
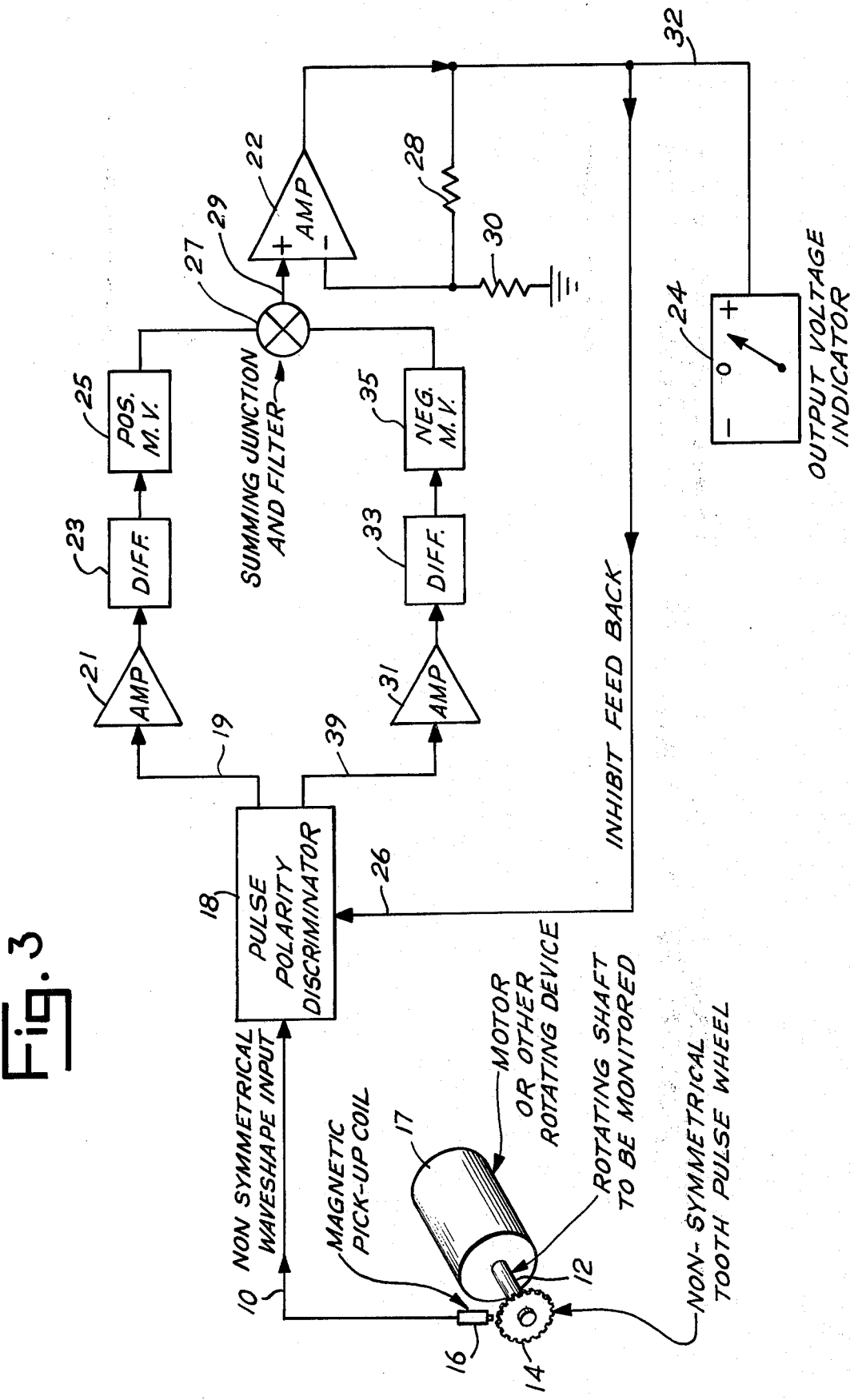
FIG. 3 is an alternate logic block diagram in accordance with the invention, where input signal frequency is a controlling parameter.

Referring more specifically to the diagram of FIGS. 1 and 1a rotation of shaft 12 of motor 17 will cause rotation of the toothed pulse wheel 14. As a wheel tooth passes the pole face 15 of the magnetic pick-up coil 16, this results in a change of clearance gap 13. This gap change modulates the magnetic flux in the pick-up coil 16, causing an electrical voltage to be generated on output line 10. This voltage waveshape will follow the flux change characteristics of the magnetic circuit. If pulse wheel 14 rotates clockwise past the pole face 15, an abrupt decrease will occur in the clearance gap as the steep side of the pulse wheel tooth enters the pole face sensing region. This results in an abrupt increase of magnetic circuit flux. Accordingly, the flux will gradually decrease as the tooth rotation continues and the tapered side of the pulse wheel tooth now passes the pole face. Another abrupt flux increase occurs as the steep side of the next tooth enters the proximity of the pole face, and the cycle continues, If the toothed wheel rotates counterclockwise, the flux change is reversed and an abrupt flux decrease is followed by a gradual flux increase.

Theoretical analysis of flux and voltage conditions in electromagnetic circuits will show that voltage amplitude is related to flux change rate and voltage polarity is related to flux change direction. These relationships cause non-symmetrical waveshapes of unequal peak amplitudes to appear on output line 10 as the toothed wheel rotates. Reversing the direction of toothed wheel rotation results in waveform inversion.

Referring to the diagram of FIGS. 2, 2a and 2b, numeral 10 designates the output line of any non-symmetrical wave generating system, consisting of a motor 17 with rotating shaft 12, upon which is mounted a non-symmetrical toothed metallic wheel 14. This wheel rotates past an electro magnetic pick-up coil 16, thereby generating a non-symmetrical electrical waveshape signal on output line 10. Typical signal waveshapes for such a wave generator are shown by 34 for forward rotation and 36 for reverse rotation of the toothed wheel. Either signal waveshape 34 or 36 is applied via line 10, to the pusle polarity discriminator 18. Assuming that rotation is such that waveshape 34 is generated, V(+) is larger than V (−) and both signals are passed substantially unimpeded thru the polarity discriminator 18 to the dual peak detector 20. The peak detector converts the peak values of the input waveshape to two DC voltages equal in polarity and amplitude to V (+) and V (−).

Both outputs of the dual peak detector are applied to summing junction 11 for combination into a net signal of amplitude (V(+) − (V(−). This net signal is applied to the non-inverting input of amplifier 22. The amplifier gain, as set by resistors 28 and 30, is sufficient to provide a voltage on amplifier output line 32 that is greater than any amplitude on sensor output line 10, thus compensating for the inherent signal losses in pulse polarity discriminator 18, dual peak detector 20 and summing junction 11. The voltage from the amplifier output line 32 is applied via the inhibit feedback line 26, to the polarity discriminator 18. This feedback action suppresses the lesser amplitude signal V(−) of waveshape 34, and the summing junction output now rises to V(+), since V(−) has been suppressed. The circuit now exhibits good conversion efficiency at output line 32, since the degradation factor V(−) has been removed, and will follow peak amplitude changes of V(+) appearing on sensor output line 10 while rejecting V(−) components. If rotation of toothed wheel 14 was opposite to that described above, waveshape 36 would appear on line 10. The circuit would operate similarly and V(+) would be suppressed. The output 32 will now follow peak amplitude changes of V(−) and reject the V(+) component. The output line 32 would be applied to a dual polarity voltage indicator 24 to register speed and direction, or used to perform some other circuit function such as to control a servo loop.

Referring now to the diagram of FIG. 3, numerals 10, 12, 14, 16, 17, 18, 22, 24, 26, 28, 30 and 32 designate elements previously described. This arrangement of FIG. 3 differs from FIG. 2 in that elements 19, 21, 23, 25, 27, 29, 31, 33, 35 and 39 establish that the input signal frequency is a controlling parameter. Assuming that toothed wheel 14 rotation direction is such that V(+) exceeds V(−) at sensor output line 10, V(+) will first overcome the operating threshold of the polarity discriminator 18, and appear at the discriminator output lines 19 and 39. This output is applied to both positive amplifier 21 and negative amplifier 31. Biasing arrangements provide that only positive amplifier 21 will respond to the positive V(+) signal from output line 19. Amplifier 21 sharpens the waveform edges and passes the signal to differentiator 23 which produces a sharp trigger pulse for the positive monostable multivibrator 25. This multivibrator produces a single uniform output pulse for each trigger pulse. This series of uniform pulses are applied to the summing junction and filter 27 where they are converted into a DC voltage on output line 29 for amplification by amplifier 22. The gain of amplifier 22 is set by resistors 28 and 30 such that the signal on line 32 is greater in amplitude than any signal or sensor output line 10, thereby effectively compensating for the inherent losses in polarity discriminator 18, amplifier 21, differentiator 23, positive multivibrator 25, and summing junction and filter 27. The output signal on line 32 is applied via the inhibit feedback line 26 to the polarity discriminator 18. This feedback suppresses the V(−) signal component from sensor output line 10 in the polarity discriminator 18 and prevents any further V(−) signal component from appearing on discriminator output lines 19 and 39. This suppression prevents the activation of negative amplifier 31 and the output signal on line 32 will be a DC voltage of positive polarity following the frequncy of the V(+) component of pick-up coil 16 output. Accordingly, if toothed wheel 14 rotation is reversed from the previous consideration, the V(−) component on the sensor output line 10 will be used to activate negative amplifier 31, differentiator 33, negative monostable multivibrator 35 and summing junction and filter 27. Circuit conditions will suppress the V(+) component on the sensor output line 10 in the polarity discriminator 18. Circuit elements 21, 23 and 25 will thus remain inactive, being insensitive to V(−) components. The output signal on line 32 will now be a DC voltage of negative polarity, following the frequency of the V(−) component of pick-up coil 16 output.

Referring to the diagram of FIG. 4, a detailed description will be given for a speed sensing circuit where signal amplitude is a controlling parameter. Assuming again that rotation is such that V(+) is larger than V(−) on pick-up coil 16 output line 10, this signal is applied simultaneously to resistors 1 and 2 in the polarity discriminator. Diode 7 clips the V(−) signal component on its cathode to signal common 9, and diode 8 clips the V(+) signal component on its anode to signal common 9. Thus, V(+) only exists input to diode 37 and V(−) only exists input to diode 38 in the dual peak detector 20. Diode 3 creates negligible loading on the V(+) component because of the relatively high impedance created by resistor 5. Diode 4 creates negligible loading on the V(−) component because of the relatively high impedance created by resistor 6. The now separated V(+) and V(−) components are passed individually thru diode 37 and diode 38, respectively, for peak detection by capacitors 41 and 42. The DC level on capacitor 41 is now substantially the peak value of V(+) and the DC level on capacitor 42 is now substantially the peak value of V(−). Both DC voltages are applied to the high impedances of resistors 43 and 44 in the summing junction 11, and the net output is obtained across resistor 40 to signal common 9. Since the assumption was that V(+) was larger than V(−), the summing junction output K (V(+) − (V(−)) will be a positive voltage to the non-inverting input of amplifier 22. The gain of amplifier 22, as set by resistors 28 and 30, is sufficient to overcome all circuit losses, including the attenuation factor K of the summing junction 11. The amplified positive DC voltage at output line 32 is now applied by feedback line 26 to the polarity discriminator 18. The feedback signal does not flow through resistor 5 because diode 3 is reverse biased for positive signals. The feedback signal, thus, does not affect the V(+) signal component on diode 7 in the polarity discriminator. The feedback signal from feedback line 26 does flow through resistor 6 because diode 4 is forward biased for positive signals. This feedback signal results in a constant forward bias on diode 8, thereby additionally suppressing the undesired V(−) signal component at diode 8. This suppression of the V(−) component causes a still larger net positive output across resistor 40 in the summing junction 11. The resultant increases of positive summing junction output, leads to additional positive output on amplifier output line 32 and additional positive inhibit feedback on line 26, until the entire V(−) component has been suppressed at diode 8 in the polarity discriminator 18. The circuit has thus automatically selected V(+) as the proper signal polarity indicative of rotation direction, and will continue to follow changes of rotational speed for that direction. The output at line 32 will be a positive DC voltage proportional to rotational speed. This output signal can now be used to indicate speed and direction of rotation, or serve other control system functions. If initial rotation was assumed in the opposite direction, V(−) would exceed V(+) and the system would accordingly control on only the V(−) component from pick-up coil 16 and suppress all V(+) components in the polarity discriminator 18. If the rotation should make a transition from one speed, through zero, to some speed in the opposite direction, the circuit will track the first speed and polarity reset the polarity selection at zero speed, and again track the opposite speed with proper reversed polarity.

Referring to FIG. 5, a detailed description will now be given for a speed sensing circuit in which signal frequency is a controlling parameter. Assuming again that rotation direction is such that V(+) exceeds V(−) on pick-up coil 16 output line 10. This signal is simultaneously applied to resistor 1 and resistor 2 in the polarity discriminator 18. Diode 7 and diode 8 are both slightly forward biased thru resistor 45 and resisotr 46 respectively. This initial slight forward bias is to prevent very low speed, low amplitude signals from erroneously activating the polarity discriminator 18. As the signal on line 10 increases with increase in speed, V(+) is first to overcome this initial bias threshold on diode 7. Diode 7 clips all V(−) components on its cathode to signal common 9 and only allows V(+) components that exceed the initial bias threshold. The V(+) signals are then applied by line 19 to the positive amplifier 21. This amplifier shapes the edges of the V(+) pulsed signal and serves as an input signal limiter. The amplifier operation is common in the art and its function need not be described further. The sharp edged V(+) pulse is applied to differentiator 23, which triggers positive monostable multivibrator 25. This multivibrator then delivers a uniform positive output pulse for each cycle of the V(+) input frequency. These uniform pulses are filtered and averaged by the summing junction and filter 27. Operation of the differentiator 23, multivibrator 25 and summing junction and filter 27 are common in the art, and their operation need not be described further. The resultant filtered DC voltage from 27 is applied by line 29 to the noninverting input of amplifier 22. The gain of amplifier 22, as set by resistors 28 and 30 is such that the output at line 32 exceeds any signal in pick-up coil output line 10. The amplified positive output at line 32 is applied by the inhibit feedback line 26 to the polarity discriminator 18. The inhibit signal does not flow through diode 3 or resistor 5 because diode 3 is reverse biased for this positive signal. The V(+) signal conditions are thus undisturbed at diode 7. The positive inhibit signal does flow through diode 4 and resistor 6, resulting in additional forward bias on diode 8 to suppress the V(−) signals from pick-up coil 16. As increased speed of rotation causes larger V(+) and V(−) signal components on line 10 to the polarity discriminator, offsetting positive output at line 32 and 26 create additional forward bias for diode 8 to maintain the suppression on V(−) signal components. Thus, V(−) signals never influence the circuit operation once the initial polarity selection has been made. The circuit will now follow the frequency of the V(+) signal only and generate a positive DC voltage proportional to this frequency. If rotation direction established that V(−) exceeds V(+) on output line 10, the circuit accordingly would now follow the frequency of the V(−) signal only, suppressing all V(+) components, and generate a negative DC voltage proportional to this frequency.

It is seen that the sensing circuit in accordance with the invention automatically selects the larger amplitude polarity of an input bi-polar non-symmetrical wave while using active feedback means to selectively and continually inhibit the smaller amplitude polarity from affecting the signal processing. The signal selected for processing may use the amplitude or the frequency characteristics of the input non-symmetrical wave as a controlling parameter. While several embodiments of the present invention have been described in detail herein, various changes and modifications may be made to satisfy requirements. Systems using capacitive sensors and companion wheels as well as optical shutters with photoelectric sensors will serve equally well to generate the required waveshape characteristics.

I claim:
1. A sensing circuit comprising a means for producing a bi-polar, non-symmetrical waveshape signal, a po- larity discriminator connected to said means, a bipolar signal processing circuit including a dual peak detector, summing junction, and non-inverting amplifier, said circuit being connected to said discriminator and controlled by the amplitude of said signal, a feedback means connecting said bi-polar signal processing circuit to said polarity discriminator for selecting one polarity component of said signal input, while rejecting the opposite polarity component.

2. A sensing circuit as defined in claim 1 in which said first mentioned means includes a non-symmetrical toothed wheel and a compatible sensor.

3. A sensing circuit as defined in claim 1 in which said signal processing circuit generates a DC voltage in response to said signal amplitude.

4. A sensing circuit as defined in claim 1 wherein said feedback means includes diodes.

* * * * *